United States Patent
Nie

(10) Patent No.: US 9,870,140 B2
(45) Date of Patent: Jan. 16, 2018

(54) ELECTRONIC DEVICE AND LAUNCHER SCREEN POSITION IDENTIFYING METHOD

(71) Applicants: SHENZHEN FUTAIHONG PRECISION INDUSTRY CO., LTD., Shenzhen (CN); Chiun Mai Communication Systems, Inc., New Taipei (TW)

(72) Inventor: Fu-Bao Nie, Shenzhen (CN)

(73) Assignees: SHENZHEN FUTAIHONG PRECISION INDUSTRY CO., LTD., Shenzhen (CN); Chiun Mai Communication Systems, Inc., New Taipei (TW)

( * ) Notice: Subject to any disclaimer, the term of this patent is extended or adjusted under 35 U.S.C. 154(b) by 398 days.

(21) Appl. No.: 14/755,586

(22) Filed: Jun. 30, 2015

(65) Prior Publication Data

US 2016/0210032 A1   Jul. 21, 2016

(30) Foreign Application Priority Data

Jan. 15, 2015   (CN) .......................... 2015 1 0019735

(51) Int. Cl.
*G06F 3/0482* (2013.01)
*G06F 3/0488* (2013.01)
*G06F 3/0485* (2013.01)

(52) U.S. Cl.
CPC .......... *G06F 3/0488* (2013.01); *G06F 3/0482* (2013.01); *G06F 3/0485* (2013.01)

(58) Field of Classification Search
CPC .. G06F 3/0482; G06F 3/04847; G06F 3/0485; G06F 3/0488
See application file for complete search history.

(56) References Cited

U.S. PATENT DOCUMENTS

| | | | |
|---|---|---|---|
| 7,631,274 B2* | 12/2009 | Kumagai | G06F 3/0481 715/815 |
| 2012/0062599 A1* | 3/2012 | Machida | G06F 1/1643 345/655 |
| 2014/0201676 A1* | 7/2014 | Du | G06F 3/0483 715/784 |

\* cited by examiner

*Primary Examiner* — Alvin Tan
(74) *Attorney, Agent, or Firm* — ScienBiziP, P.C.

(57) ABSTRACT

A launcher screen position identifying method obtains a set of coordinates of a reference point of each launcher screen and a set of coordinates of a reference point of a touch screen. The method calculates a distance difference between each launcher screen and the touch screen according to the set of coordinates of the reference point of each launcher screen and the set of coordinates of the reference point of the touch screen, and the method converts the distance difference between each launcher screen and the touch screen to a scalar value of the corresponding launcher screen. The scalar value is between negative one and positive one. The method further identifies a position relationship between each launcher screen and the touch screen according to the scalar value of the corresponding launcher screen. A related electronic device and a related non-transitory storage medium are provided.

20 Claims, 6 Drawing Sheets

ELECTRONIC DEVICE AND LAUNCHER SCREEN POSITION IDENTIFYING METHOD

CROSS-REFERENCE TO RELATED APPLICATIONS

This application claims priority to Chinese Patent Application No. 201510019735.3 filed on Jan. 15, 2015, the contents of which are incorporated by reference herein.

FIELD

The subject matter herein generally relates to electronic devices, and particularly, to an electronic device capable of determining a position relationship between each launcher screen and a touch screen.

BACKGROUND

An operation system (e.g. Android) of an electronic device can employ one or more launcher screens to display icons of applications. Each launcher screen can replace another launcher screen currently displayed on a touch screen of the electronic device in response to user operation.

BRIEF DESCRIPTION OF THE DRAWINGS

Implementations of the present technology will now be described, by way of example only, with reference to the attached figures.

DETAILED DESCRIPTION

Figure 1:
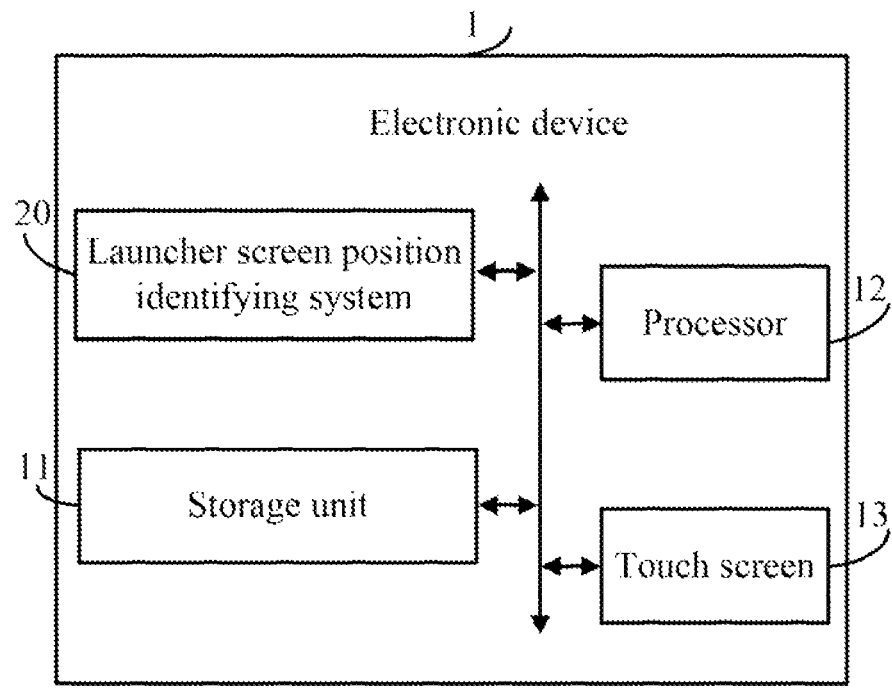
FIG. 1 is a block diagram showing an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

In general, the word "module," as used herein, refers to logic embodied in hardware or firmware, or to a collection of software instructions, written in a programming language. The software instructions in the modules can be embedded in firmware, such as in an erasable programmable read-only memory (EPROM) device. The modules described herein can be implemented as either software and/or hardware modules and can be stored in any type of computer-readable medium or other storage device. The term "comprising" means "including, but not necessarily limited to"; it specifically indicates open-ended inclusion or membership in a so-described combination, group, series and the like.

Embodiments of the present disclosure will be described in relation to the accompanying drawings.

FIG. 1 illustrates an embodiment of an electronic device 1. In the embodiment, the electronic device 1 can be a portable electronic device, such as a smart phone, a tablet personal computer, a personal digital assistant, or the like. The electronic device 1 can include, but is not limited to, a storage unit 11, a processor 12, and a touch screen 13. In the embodiment, the storage unit 11 can be coupled to the processor 12. In the embodiment, the storage unit 11 can be a hard disk, a compact disk, or a flash memory, for example. The flash memory can be a smart media (SM) card, a compact flash (CF) card, a secure digital (SD) card, an xd-picture (XD) card, or the like. The processor 12 can be a central processing unit, a digital signal processor, or a single chip, for example. In the embodiment, the touch screen 13 can be coupled to the processor 12. The touch screen 13 can be a liquid crystal display, an organic light-emitting diode, or the like. The touch screen 13 can be configured to display launcher screens.

The electronic device 1 can include one or more launcher screens. A launcher screen currently displayed on the touch screen 13 (hereinafter, currently displayed launcher screen) can be replaced by another launcher screen in response to user operation. For example, suppose the electronic device 1 includes a launcher screen A and a launcher screen B, the launcher screen A is on the left side of the launcher screen B, and the launcher screen A is currently displayed on the touch screen 13, thus, the launcher screen B can replace the launcher screen A by swiping from right to left. In the embodiment, each launcher screen can include a reference point, and the touch screen 13 can also include a reference point. The reference point of each launcher screen and the reference point of the touch screen 13 can be default or set by the user. In the embodiment, the electronic device 1 can obtain a set of coordinates of a reference point of each launcher screen in real time and a set of coordinates of a reference point of the touch screen 13 in real time, to determine a distance difference between each launcher screen and the touch screen 13. The electronic device 1 can further convert the distance difference between each launcher screen and the touch screen 13 into a scalar value of the corresponding launcher screen to identify a position relationship between the corresponding launcher screen and the touch screen 13.

Figure 2:
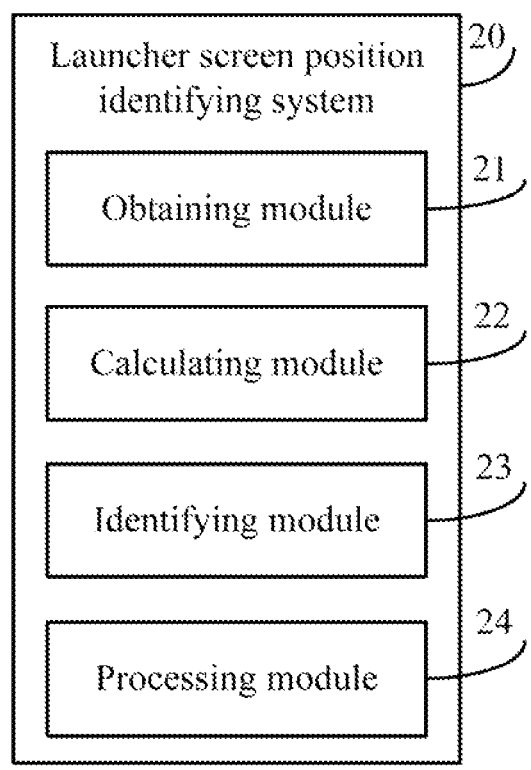
FIG. 2 is a block diagram showing an embodiment of a launcher screen position identifying system.

In the embodiment, as shown in FIG. 2, the electronic device 1 can further include a launcher screen position identifying system 20. In the embodiment, the launcher screen position identifying system 20 can include an obtaining module 21, a calculating module 22, an identifying module 23, and a processing module 24. One or more programs of the function modules can be stored in the storage unit 11 and executed by the processor 12.

In the embodiment, the obtaining module 21 can be configured to obtain the set of coordinates of the reference point of each launcher screen and the set of coordinates of the reference point of the touch screen 13.

In the embodiment, the reference point of each launcher screen can be superposed with the reference point of the touch screen 13 when the corresponding launcher screen is currently displayed on the touch screen 13. For example, a launcher screen C is currently displayed on the touch screen 13, thus, the reference point of the launcher screen C is superposed with the reference point of the touch screen 13, and when a launcher screen D replaces the launcher screen C by swiping across the touch screen 13, the reference point of the launcher screen D replaces the reference point of the launcher screen C to be superposed with the reference point of the touch screen 13. In the embodiment, the reference point of each launcher screen can be a center of the corresponding launcher screen, and the reference point of the touch screen 13 can also be a center of the touch screen 13. In other embodiments, the reference point of each launcher screen can be another point of the corresponding launcher screen rather than the center of the corresponding launcher screen, and the reference point of the touch screen 13 can also be another point of the touch screen 13 rather than the center of the touch screen 13. The electronic device 1 can include a coordinate system which aims to determine the position of each point on the touch screen 13. The obtaining module 21 can employ the coordinate system to obtain the set of coordinates of the reference point of each launcher screen and the set of coordinates of the reference point of the touch screen 13.

Figure 3:
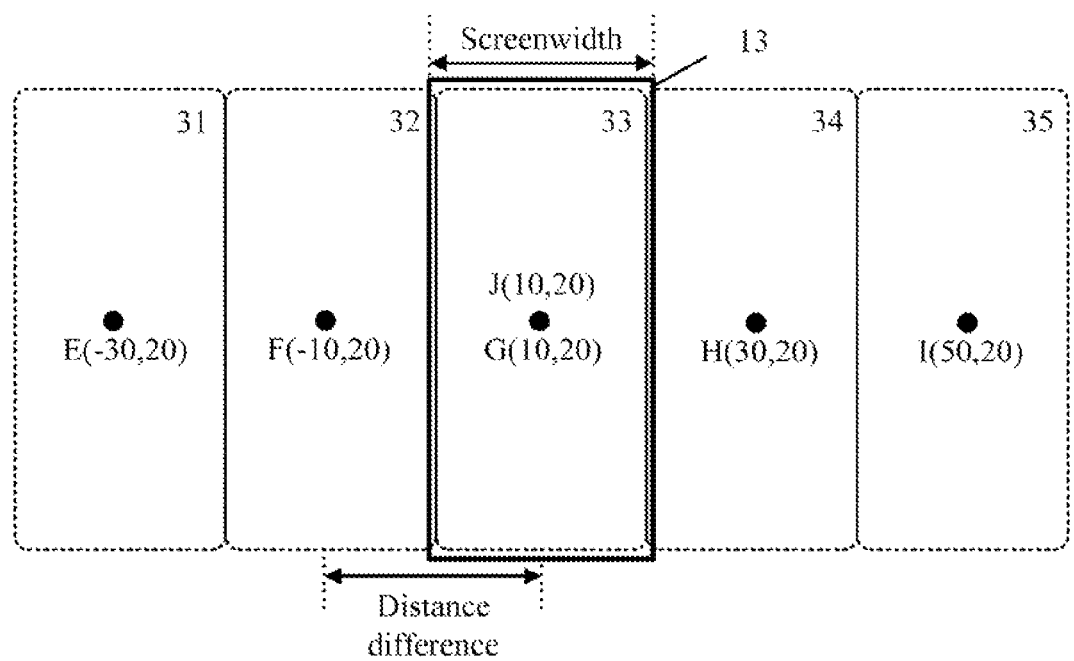
FIG. 3 is a view showing the position relationship between each launcher screen and a touch screen of the electronic device of FIG. 1.

For example, as shown in FIG. 3, the electronic device 1 can include five launcher screens, respectively, a first launcher screen 31, a second launcher screen 32, a third launcher screen 33, a fourth launcher screen 34, and a fifth launcher screen 35, and the currently displayed launcher screen is the third launcher screen 33. The set of coordinates of the reference point E of the first launcher screen 31 can be (−30, 20), the set of coordinates of the reference point F of the second launcher screen 32 can be (−10, 20), the set of coordinates of the reference point G of the third launcher screen 33 can be (10, 20), the set of coordinates of the reference point H of the fourth launcher screen 34 can be (30, 20), and the set of coordinates of the reference point I of the fifth launcher screen 35 can be (50, 20). The set of coordinates of the reference point J of the touch screen 13 can be (10, 20).

In the embodiment, the calculating module 22 can be configured to calculate the distance difference between each launcher screen and the touch screen 13 according to the set of coordinates of the reference point of each launcher screen and the set of coordinates of the reference point of the touch screen 13. In the embodiment, the distance difference between each launcher screen and the touch screen 13 can be a sliding distance that the corresponding launcher screen needs to move to be currently displayed on the touch screen 13. In the embodiment, the calculating module 22 can determine a difference value between the set of coordinates of the reference point of each launcher screen and the set of coordinates of the reference point of the touch screen 13 to calculate the distance difference between each launcher screen and the touch screen 13.

In detail, a sliding manner of the launcher screens of the electronic device 1 can be slid up and down or slid left and right. When the sliding manner of the launcher screens of the electronic device 1 is slid up and down, the abscissas of the reference points of the launcher screens are invariable no matter whether the launcher screens are slid up or down. Thus, the calculating module 22 can determine the ordinate difference between the reference point of each launcher screen and the reference point of the touch screen 13 to be the distance difference between each launcher screen and the touch screen 13 when the sliding manner of the launcher screens of the electronic device 1 is slid up and down. When the sliding manner of the launcher screens of the electronic device 1 is slid left and right, the ordinates of the reference points of the launcher screens are invariable no matter whether the launcher screens are slid left or right. Thus, the calculating module 22 can determine the abscissa difference between the reference point of each launcher screen and the reference point of the touch screen 13 to be the distance difference between each launcher screen and the touch screen 13 when the sliding manner of the launcher screens of the electronic device 1 is slid left and right. In the embodiment, the distance difference between each launcher screen and the touch screen 13 can be positive, negative, or zero. For example, in FIG. 3, the distance difference between the first launcher screen 31 and the touch screen 13 is −40, the distance difference between the second launcher screen 32 and the touch screen 13 is −20, the distance difference between the third launcher screen 33 and the touch screen 13 is 0, the distance difference between the fourth launcher screen 34 and the touch screen 13 is 20, and the distance difference between the fifth launcher screen 35 and the touch screen 13 is 40.

In the embodiment, the identifying module 23 can be configured to convert the distance difference between each launcher screen and the touch screen 13 to a scalar value of the corresponding launcher screen. The scalar value is between negative one and positive one. The identifying module 23 can be further configured to identify the position relationship between each launcher screen and the touch screen 13 according to the scalar value of the corresponding launcher screen.

In the embodiment, the identifying module 23 can convert the distance difference between each launcher screen and the touch screen 13 to the scalar value of the corresponding launcher screen according to a formula:

$$a=\min(1, \text{diff/screenwidth}); \text{progress}=\max(-1, a)$$

Where "diff" can be the distance difference between one launcher screen and the touch screen 13; "screenwidth" can be a width of the touch screen 13, and "progress" can be the scalar value of the corresponding launcher screen. For example, as shown in FIG. 3, the scalar value of the first launcher screen 31 can be negative one, the scalar value of the second launcher screen 32 can be negative one, the scalar value of the third launcher screen 33 can be zero, the scalar value of the fourth launcher screen 34 can be positive one, and the scalar value of the fifth launcher screen 35 can be positive one.

FIG. 3 illustrates that the position between each launcher screen and the touch screen 13 is related to the scalar value of the corresponding launcher screen. The scalar values of the launcher screens which can replace another currently displayed launcher screen by swiping from left to right are negative one. The scalar value of the currently displayed launcher screen is zero. The scalar values of the launcher screens which can replace another currently displayed launcher screen by swiping from right to left are positive one. That is, the identifying module 23 can determine whether the launcher screens are on the left side or on the right side of another currently displayed launcher screen according to the negative or the positive of the scalar values of the launcher screens.

FIG. 3 further illustrates that the scalar value of the launcher screen can vary when the launcher screen replaces another currently displayed launcher screen or when the currently displayed launcher screen is replaced by another launcher screen. In detail, the scalar value of the launcher screen can gradually increase from negative one to zero when the launcher screen gradually replaces another currently displayed launcher screen by swiping from left to right. The scalar value of the launcher screen can further gradually increase from zero to positive one when the currently displayed launcher screen is gradually replaced by another launcher screen by swiping from left to right. The scalar value of the launcher screen can gradually decrease from positive one to zero when the launcher screen gradually replaces another currently displayed launcher screen by swiping from right to left. The scalar value of the launcher screen can further gradually decrease from zero to negative one when the currently displayed launcher screen is gradually replaced with another launcher screen by swiping from right to left.

Figure 4:
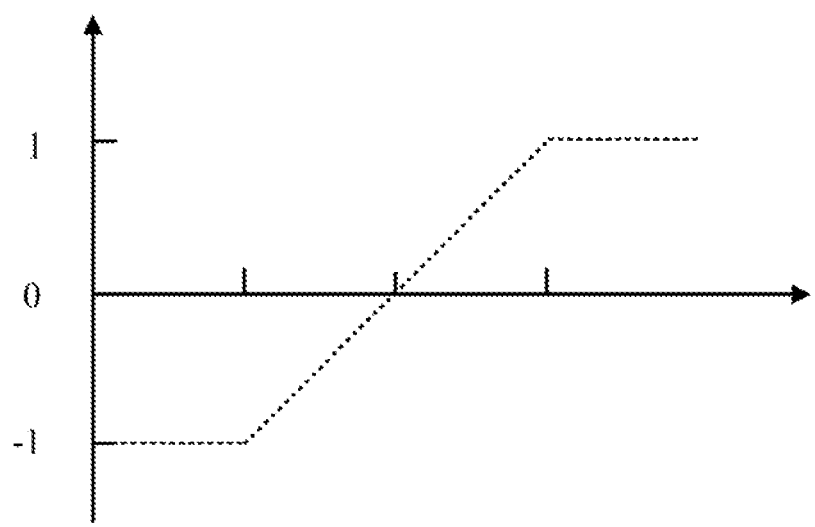
FIG. 4 is a graph showing a varying scalar value of the launcher screen which replaces another launcher screen currently displayed on the touch screen by swiping from left to right and then is replaced by another launcher screen by swiping from left to right.

For example, as shown in FIG. 3, when the second launcher screen 32 gradually replaces a currently displayed third launcher screen 33 by swiping from left to right, and then is gradually replaced by the first launcher screen 31 by swiping from left to right, the graph showing the variation of the scalar value of the second launcher screen 32 can be seen in FIG. 4. That is, the scalar value of the second launcher screen 32 gradually increases from negative one to zero when the second launcher screen 32 gradually replaces the currently displayed third launcher screen 33 by swiping from left to right. When the scalar value of the second launcher screen 32 is zero, the second launcher screen 32 completely replaces the currently displayed third launcher screen 33. The scalar value of the second launcher screen 32 further gradually increases from zero to positive one when the currently displayed second launcher screen 32 is gradually replaced by the first launcher screen 31 by swiping from left to right. When the scalar value of the second launcher screen 32 is one, the second launcher screen 32 can completely replace the currently displayed first launcher screen 31.

Figure 5:
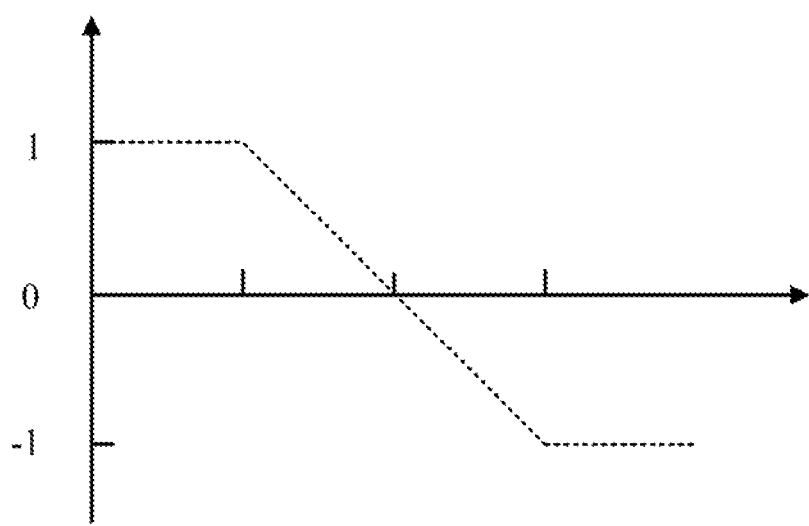
FIG. 5 is a graph showing a varying scalar value of the launcher screen which replaces another launcher screen currently displayed on the touch screen by swiping from right to left and then is replaced by another launcher screen by swiping from right to left.

On the contrary, when the fourth launcher screen 34 gradually replaces a currently displayed third launcher screen 33 by swiping from right to left, and then is gradually replaced by the fifth launcher screen 35 by swiping from right to left, the graph showing the variation of the scalar value of the fourth launcher screen 34 can be seen in FIG. 5. That is, the scalar value of the fourth launcher screen 34 gradually decreases from positive one to zero when the fourth launcher screen 34 gradually replaces the currently displayed third launcher screen 33 by swiping from right to left. When the scalar value of the fourth launcher screen 34 is zero, the fourth launcher screen 34 completely replaces the currently displayed third launcher screen 33. The scalar value of the fourth launcher screen 34 further gradually decreases from zero to negative one when the currently displayed fourth launcher screen 34 is gradually replaced by the fifth launcher screen 35 by swiping from right to left. When the scalar value of the fourth launcher screen 34 is one, the currently displayed fourth launcher screen 34 is completely replaced by the fifth launcher screen 35.

Therefore, no matter whether the launcher screens are slid from left to right or slid from right to left, the currently displayed launcher screen corresponds to one scalar value of the launcher screen, and the launcher screen on the left side of or the right side of another currently displayed launcher screen correspond to another different scalar value of the launcher screen. The identifying module 23 can determine whether the launcher screen is currently displayed on the touch screen 13 or is on the left side of or on the right side of another launcher screen currently displayed on the touch screen 13 according to the scalar value of the launcher screen. For example, when the scalar value of the launcher screen is zero, the identifying module 23 determines that the launcher screen is currently displayed on the touch screen 13. Therefore, in conjunction with the aforementioned description of determining whether the launcher screens are on the left side or on the right side of another launcher screen currently displayed on the touch screen 13, the identifying module 23 can identify the position relationship between each launcher screen and the touch screen 13.

In the embodiment, the processing module 24 can be configured to execute a processing of the launcher screens according to the position relationship between each launcher screen and the touch screen 13. For example, the processing module 24 can gradually adjust icons displayed on the launcher screens when the position relationship changes. The processing module 24 can gradually increase sizes of icons displayed on the third launcher screen 33 when the position relationship between the third launcher screen 33 and the touch screen 13 is that the third launcher screen 33 gradually replaces the currently displayed second launcher screen 32 by swiping across the touch screen 13. Later, the processing module 24 can gradually decrease the sizes of icons displayed on the third launcher screen 33 when the position relationship between the third launcher screen 33 and the touch screen 13 is that the fourth launcher screen 34 gradually replaces the currently displayed third launcher screen 33 by swiping across the touch screen 13. In other words, the processing module 24 can gradually adjust sizes of icons displayed on the third launcher screen 33 when the third launcher screen 33 enters or leaves the touch screen 13.

Figure 6:
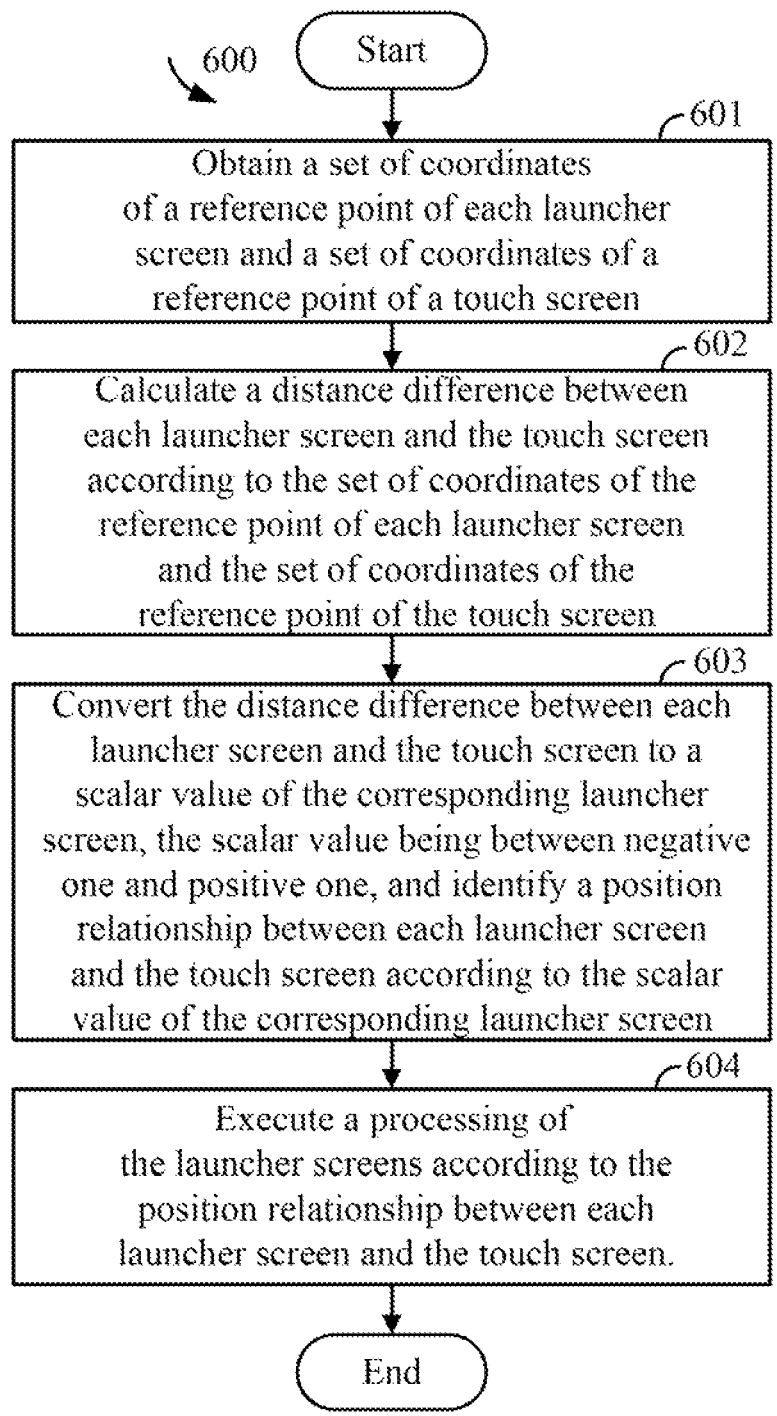
FIG. 6 is a flowchart showing an embodiment of a launcher screen position identifying method.

FIG. 6 illustrates an embodiment of a launcher screen position identifying method 600. In the embodiment, the method 600 is provided by way of example, as there are a variety of ways to carry out the method 600. The method 600 described below can be carried out using the configurations illustrated in FIGS. 1 and 2, for example, and various elements of these figures are referenced in the explanation of the method. Each block shown in FIGS. 1 and 2 represents one or more processes, methods, or subroutines carried out in the method. Additionally, the illustrated order of blocks is by example only and the order of the blocks can change. The method 600 can begin at block 601.

At block 601, an obtaining module obtains a set of coordinates of a reference point of each launcher screen and a set of coordinates of a reference point of a touch screen. In the embodiment, the obtaining module employs a coordinate system to obtain the set of coordinates of the reference point of each launcher screen and the set of coordinates of the reference point of the touch screen.

At block 602, a calculating module calculates a distance difference between each launcher screen and the touch screen according to the set of coordinates of the reference point of each launcher screen and the set of coordinates of the reference point of the touch screen. In the embodiment, the distance difference between each launcher screen and the touch screen is a sliding distance that the corresponding launcher screen needs to move to replace another launcher screen currently displayed on the touch screen (hereinafter, another currently displayed launcher screen). In the embodiment, the calculating module determines a difference value between the set of coordinates of the reference point of each launcher screen and the set of coordinates of the reference point of the touch screen to calculate the distance difference between each launcher screen and the touch screen.

At block 603, an identifying module converts the distance difference between each launcher screen and the touch screen to a scalar value of the corresponding launcher screen. The scalar value is between negative one and positive one. The identifying module further identifies a position relationship between each launcher screen and the touch screen according to the scalar value of the corresponding launcher screen.

In the embodiment, the identifying module converts the distance difference between each launcher screen and the touch screen to the scalar value of the corresponding launcher screen according to a formula:

$$a=\min(1, \text{diff/screenwidth}); \text{progress}=\max(-1, a)$$

Where "diff" can be the distance difference between one launcher screen and the touch screen; "screenwidth" can be a width of the touch screen, and "progress" can be the scalar value of the corresponding launcher screen.

In detail, the scalar values of the launcher screens which can replace another currently displayed launcher screen by swiping from left to right are negative one. The scalar value of the launcher screen currently displayed on the touch screen (hereinafter, currently displayed launcher screens) is zero. The scalar values of the launcher screens which can replace another currently displayed launcher screen by swiping from right to left are positive one. Namely, the identifying module determines whether the launcher screens are on the left side or on the right side of another currently displayed launcher screen according to the negative or the positive of the scalar values of the launcher screens.

The scalar values of the launcher screens can vary when the launcher screens gradually replace another currently displayed launcher screen or when the currently displayed launcher screen is gradually replaced by another launcher screen by swiping across the touch screen. In detail, the scalar value of the launcher screen gradually increases from negative one to zero when the launcher screen gradually replaces another currently displayed launcher screen by swiping from left to right. The scalar value of the launcher screen further gradually increases from zero to positive one when the currently displayed launcher screen is gradually replaced by another launcher screen by swiping from left to right. The scalar value of the launcher screen gradually decreases from positive one to zero when the launcher screen gradually replaces another currently displayed launcher screen by swiping from right to left. The scalar value of the launcher screen further gradually decreases from zero to negative one when the currently displayed launcher screen is gradually replaced by another launcher screen by swiping from right to left.

At block 604, a processing module executes a processing of the launcher screens according to the position relationship between each launcher screen and the touch screen.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An electronic device comprising:
a processor;
a touch screen coupled to the processor and configured to display launcher screens; and
a non-transitory computer readable medium coupled to the processor and configured to store instructions for the processor to:
obtain a set of coordinates of a reference point of each launcher screen and a set of coordinates of a reference point of the touch screen;
calculate a distance difference between each launcher screen and the touch screen according to the set of coordinates of the reference point of each launcher screen and the set of coordinates of the reference point of the touch screen;
convert the distance difference between each launcher screen and the touch screen to a scalar value of the corresponding launcher screen, the scalar value being between negative one and positive one; and
identify a position relationship between each launcher screen and the touch screen according to the scalar value of the corresponding launcher screen.

2. The electronic device as described in claim 1, wherein the reference point of each launcher screen is superposed with the reference point of the touch screen when the corresponding launcher screen is currently displayed on the touch screen.

3. The electronic device as described in claim 1, wherein the distance difference between each launcher screen and the touch screen is a sliding distance that the corresponding launcher screen needs to move to be currently displayed on the touch screen.

4. The electronic device as described in claim 1, wherein the non-transitory computer readable medium further stores instructions for the processor to convert the distance difference between each launcher screen and the touch screen to the scalar value of the corresponding launcher screen according to a formula:

$$a=\min(1, \text{diff/screenwidth}); \text{progress}=\max(-1, a)$$

Where "diff" is the distance difference between one launcher screen and the touch screen; "screenwidth" is a width of the touch screen, and "progress" is the scalar value of the corresponding launcher screen.

5. The electronic device as described in claim 1, wherein the scalar values of the launcher screens which can replace another launcher screen currently displayed on the touch screen by swiping from left to right are negative one, the scalar value of the launcher screen currently displayed on the touch screen is zero, and the scalar values of the launcher screens which can replace another launcher screen currently displayed on the touch screen by swiping from right to left are positive one.

6. The electronic device as described in claim 1, wherein the non-transitory computer readable medium further stores instructions for the processor to gradually adjust icons displayed on the launcher screens when the position relationship between each launcher screen and the touch screen changes.

7. The electronic device as described in claim 1, wherein the non-transitory computer readable medium further stores instructions for the processor to gradually adjust sizes of icons displayed on one of the launcher screens when the one launcher screen enters or leaves the touch screen.

8. A launcher screen position identifying method comprising:
 obtaining a set of coordinates of a reference point of each of a plurality of launcher screens and a set of coordinates of a reference point of a touch screen;
 calculating a distance difference between each launcher screen and the touch screen according to the set of coordinates of the reference point of each launcher screen and the set of coordinates of the reference point of the touch screen; and
 converting the distance difference between each launcher screen and the touch screen to a scalar value of the corresponding launcher screen, the scalar value being between negative one and positive one; and
 identifying a position relationship between each launcher screen and the touch screen according to the scalar value of the corresponding launcher screen.

9. The launcher screen position identifying method as described in claim 8, wherein the reference point of each launcher screen is superposed with the reference point of the touch screen when the corresponding launcher screen is currently displayed on the touch screen.

10. The launcher screen position identifying method as described in claim 8, wherein the distance difference between each launcher screen and the touch screen is a sliding distance that the corresponding launcher screen needs to move to be currently displayed on the touch screen.

11. The launcher screen position identifying method as described in claim 8, wherein the method further comprises:
 converting the distance difference between each launcher screen and the touch screen to the scalar value of the corresponding launcher screen according to a formula:

$a = \min(1, \text{diff}/\text{screenwidth}); \text{progress} = \max(-1, a)$

Where "diff" is the distance difference between one launcher screen and the touch screen; "screenwidth" is a width of the touch screen, and "progress" is the scalar value of the corresponding launcher screen.

12. The launcher screen position identifying method as described in claim 8, wherein the scalar values of the launcher screens which can replace another launcher screen currently displayed on the touch screen by swiping from left to right are negative one, the scalar value of the launcher screen currently displayed on the touch screen is zero, and the scalar values of the launcher screens which can replace another launcher screen currently displayed on the touch screen by swiping from right to left are positive one.

13. The launcher screen position identifying method as described in claim 8, wherein the method further comprises:
 gradually adjusting icons displayed on the launcher screens when the position relationship between each launcher screen and the touch screen changes.

14. The launcher screen position identifying method as described in claim 8, wherein the method further comprises:
 gradually adjusting sizes of icons displayed on one of the launcher screens when the one launcher screen enters or leaves the touch screen.

15. A non-transitory storage medium storing a set of instructions, the set of instructions capable of being executed by a processor of the electronic device, causing the electronic device to perform a launcher screen position identifying method, the method comprising:
 obtaining a set of coordinates of a reference point of each of a plurality of launcher screens and a set of coordinates of a reference point of a touch screen;
 calculating a distance difference between each launcher screen and the touch screen according to the set of coordinates of the reference point of each launcher screen and the set of coordinates of the reference point of the touch screen;
 converting the distance difference between each launcher screen and the touch screen to a scalar value of the corresponding launcher screen, the scalar value being between negative one and positive one; and
 identifying a position relationship between each launcher screen and the touch screen according to the scalar value of the corresponding launcher screen.

16. The non-transitory storage medium as described in claim 15, wherein the reference point of each launcher screen is superposed with the reference point of the touch screen when the corresponding launcher screen is currently displayed on the touch screen.

17. The non-transitory storage medium as described in claim 15, wherein the method further comprises:
 converting the distance difference between each launcher screen and the touch screen to the scalar value of the corresponding launcher screen according to a formula:

$a = \min(1, \text{diff}/\text{screenwidth}); \text{progress} = \max(-1, a)$

Where "diff" is the distance difference between one launcher screen and the touch screen; "screenwidth" is a width of the touch screen, and "progress" is the scalar value of the corresponding launcher screen.

18. The non-transitory storage medium as described in claim 15, wherein the scalar values of the launcher screens which can replace another launcher screen currently displayed on the touch screen by swiping from left to right are negative one, the scalar value of the launcher screen currently displayed on the touch screen is zero, and the scalar values of the launcher screens which can replace another launcher screen currently displayed on the touch screen by swiping from right to left are positive one.

19. The non-transitory storage medium as described in claim 15, wherein the method further comprises:
 gradually adjusting icons displayed on the launcher screens when the position relationship between each launcher screen and the touch screen changes.

20. The non-transitory storage medium as described in claim 15, wherein the method further comprises:
 gradually adjusting sizes of icons displayed on one of the launcher screens when the one launcher screen enters or leaves the touch screen.

* * * * *